UNITED STATES PATENT OFFICE.

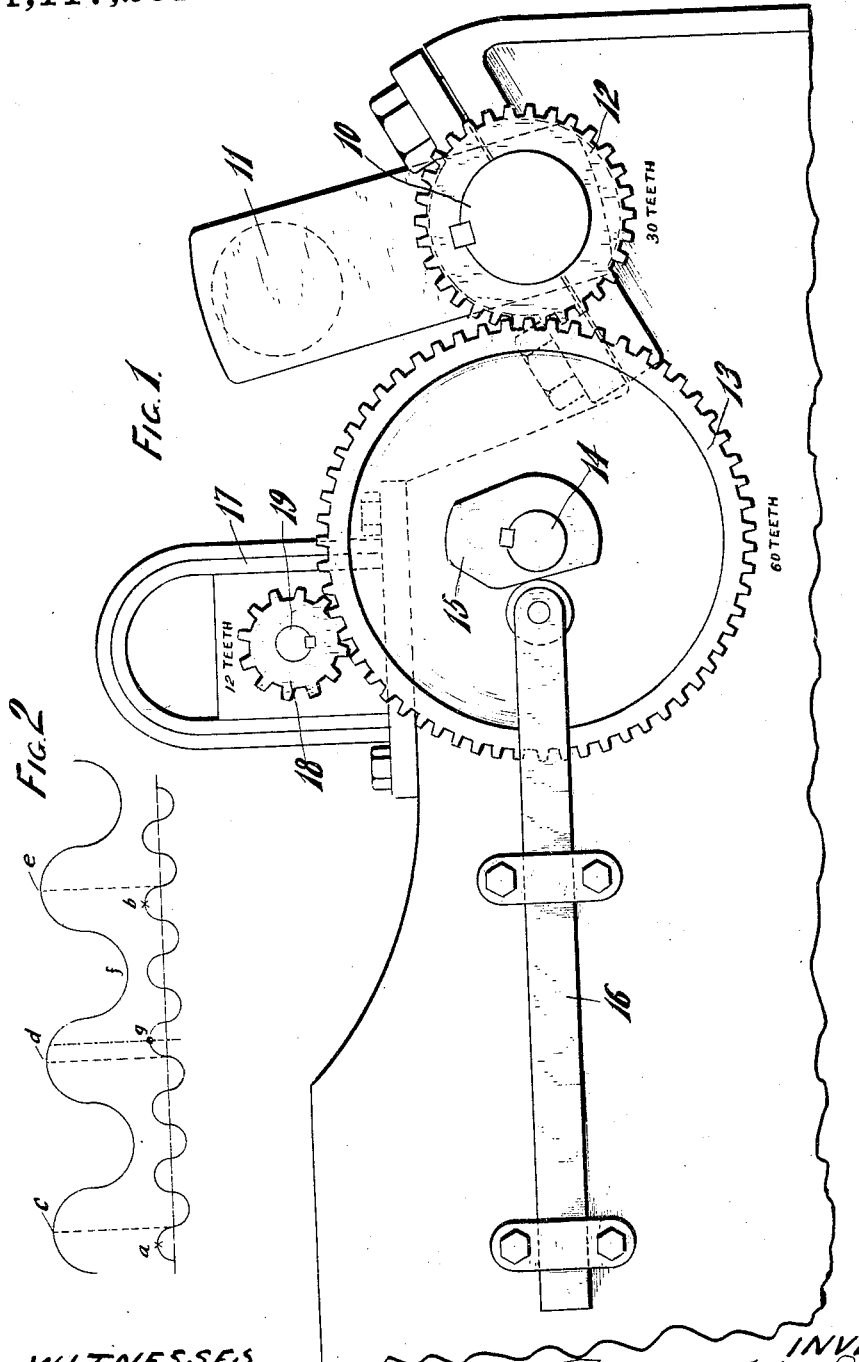

ROBERT HERMAN LIBKE, OF CHILTON, WISCONSIN, ASSIGNOR TO STEINER MANUFACTURING COMPANY, OF CHILTON, WISCONSIN, A CORPORATION OF WISCONSIN.

INTERNAL-COMBUSTION ENGINE.

1,117,201.   Specification of Letters Patent.   Patented Nov. 17, 1914.

Application filed June 13, 1914. Serial No. 844,871.

*To all whom it may concern:*

Be it known that I, ROBERT H. LIBKE, a citizen of the United States, and resident of Chilton, in the county of Calumet and State of Wisconsin, have invented new and useful Improvements in Internal-Combustion Engines, of which the following is a description, reference being had to the accompanying drawings, which are a part of this specification.

This invention has for its object to provide an internal combustion engine with a magneto ignition mechanism having the magneto driven from the crank shaft at a speed ratio of two and one-half to one.

Heretofore it has been common practice to gear a magneto directly with the half time gear with a pinion having half the number of gear teeth as the gear on the crank shaft, thus causing the magneto to revolve at a speed ratio of two to one with relation to the crank shaft. Such gear ratio has been found efficient both in the normal running operation of the engine and in the starting of the engine where the crank shaft, after having been turned a sufficient distance in the direction of the normal running of the engine to draw into the cylinder an explosive charge, is then turned backward to cause the piston to compress the charge, and when a suitable degree of compression is attained the igniting mechanism is actuated. Although at such time this takes place in a somewhat different position of the parts from the ordinary ignition during engine running, the gear ratio of two to one causes the operation of the ignition mechanism to take place sufficiently coincident with the attainment of the peak of the wave of current generated by the magneto to result in an efficient ignition, so that the piston is driven as in the normal operation of the engine and the engine is thus started. It has been supposed that this gear ratio of two to one between the magneto shaft and the crank shaft is the only one which will give sufficient current impulse at the proper time under ordinary starting conditions for igniting the charge and still not have the magneto acquire a speed at the full running speed of the engine that will fail to develop its maximum efficiency. I have found that the gear ratio of two and one-half to one between the magneto shaft and the crank shaft will result in equally efficient ignition, both at the starting of the engine and during the running at high speed.

With the above and other objects in view the invention consists in the internal combustion engine as herein claimed and all equivalents.

Referring to the accompanying drawings: Figure 1 is a detail view of the gear driving connection between the crank shaft and the magneto shaft of an engine constructed in accordance with this invention; and, Fig. 2 is a diagram of the alternating current produced by the magneto, showing the successive sparking points.

In these drawings 10 indicates a crank shaft carrying the crank member 11 and a gear 12 which in the present instance contains thirty gear teeth. This gear meshes with a gear wheel 13 of twice the number of gear teeth on the cam shaft as usual, said cam shaft being provided with a cam 15 to operate the valve rod 16 in the ordinary manner. A magneto 17 is shown as representing a magneto ignition system, without illustrating the wiring connections which are as usual, and this magneto is provided with a pinion 18 meshing with the gear wheel 13, and in this instance provided with twelve gear teeth so that the speed ratio of the magneto shaft 19 to the crank shaft 10 is two and one-half to one. Obviously the number of teeth in the various gear wheels may differ from the example illustrated, providing the gear teeth in the gear wheel 12 are two and one-half times the number of gear teeth in the pinion 18. With this gear ratio of two and one-half to one the ignition, which as usual takes place with each revolution of the cam shaft 14, occurs on the peak of every fifth wave of current generated by the magneto instead of on every fourth wave, as with the gear ratio of two to one. This is shown in the diagram of Fig. 2 at the points marked "*a, b*" on the lower curve, while the movements of the piston are indicated by the upper curve, the end of the inward stroke of the piston being indicated by the points *c, d* and *e* respectively, from which vertical lines are dropped to the lower curve. It will thus be seen that ignition takes place during ordinary running at the peak of a wave of current generated by the magneto while the crank is nearing the end of its compression stroke.

On starting the engine the piston is moved through its intake stroke from the point $d$ to a point $f$ so as to draw in a charge of explosive mixture, and is then backed toward the point $d$ and ignition is produced at the point $g$, before the piston has reached the end of its inward stroke. The compressed charge is thus exploded and the engine starts in its normal operation. The speed of the magneto on starting the engine is somewhat greater than with an engine with the gear ratio of two to one, and the peak of the current wave is produced at a point favorable to the attainment of proper compression so that starting is easily accomplished. When the engine is running at full speed the speed of the magneto is not excessive and it develops its maximum efficiency.

What I claim as new and desire to secure by Letters Patent is:

1. In an internal combustion engine, a magneto ignition system having the magneto geared with the crank shaft at a speed ratio of two and one-half to one.

2. In an internal combustion engine, a crank shaft, a half speed gear driven thereby, and a magneto ignition system with the magneto geared to the half time gear at a speed ratio of two and one-half to one with relation to the crank shaft.

In testimony whereof, I affix my signature, in presence of two witnesses.

ROBERT HERMAN LIBKE.

Witnesses:
A. C. KINGSTON,
H. J. SCHOMMER.